United States Patent [19]

Kim

[11] Patent Number: 5,559,771
[45] Date of Patent: Sep. 24, 1996

[54] TRACKING CONTROL APPARATUS AND OPTICAL PICKUP HAVING THE SAME

[75] Inventor: Seong-Min Kim, Incheon, Rep. of Korea

[73] Assignee: Daewoo Electronics Co., Ltd., Seoul, Rep. of Korea

[21] Appl. No.: 429,632

[22] Filed: Apr. 27, 1995

[30] Foreign Application Priority Data

Apr. 30, 1994 [KR] Rep. of Korea .................. 94-9415

[51] Int. Cl.⁶ .................................................. G11B 7/09
[52] U.S. Cl. ................................. 369/44.35; 369/44.37
[58] Field of Search .......................... 369/44.12, 44.35, 369/44.37, 54, 121–122, 44.11, 44.29

[56] References Cited

U.S. PATENT DOCUMENTS 4,761,773  8/1988  Okada et al. ...................... 369/44.29

*Primary Examiner*—W. R. Young
*Attorney, Agent, or Firm*—Fish & Richardson, P.C.

[57] ABSTRACT

A tracking control apparatus comprises a laser source having a plurality of laser emitting devices each of which can be operated selectively. A beam emitted from the laser source is reflected from disk, and then the beam is received by a photodetector. A tracking error is detected on the basis of an image of the beam received by the photodetector, and a tracking error signal is generated by a tracking error signal generating device. In response to this tracking error signal, an actuating device selectively actuates only light emitting devices located at a position compensatory for the tracking error among the laser emitting devices. Thus, in controlling tracking with the laser source having a plurality of laser emitting devices, the sensitivity to the frequency is maintained excellently even to a multiple GHz frequency, thereby providing correct tracking control.

7 Claims, 3 Drawing Sheets

TRACKING CONTROL APPARATUS AND OPTICAL PICKUP HAVING THE SAME

BACKGROUND OF THE INVENTION

1. Field of the Invention

The present invention relates to a tracking control apparatus and an optical pickup having the same. More particularly, the present invention relates to a tracking control apparatus for compensating tracking error signals by controlling a position of a laser beam irradiated onto tracks of an optical disk and an optical pickup having the same.

2. Description of the Prior Arts

Data recording/reproducing apparatuses using optical disks such as a laser disk (LD) and a compact disk (CD) have been commercially available in recent years. In order to read out data from an optical disk, a laser beam is irradiated onto a data recording track (to be referred to as a track hereinafter), and data are reproduced based on the beam reflected by the track. When the tracks are helically formed on the optical disk, since the sectors of a single track are not equidistant from the center of the rotation of the disk, tracking (radial) control is necessary in the read mode to accurately irradiate the track with a laser beam. Even if the tracks are concentrically formed, sectors of a single track are not equidistant from the center of the rotation of the disk due to the eccentricity in the disk, and therefore, tracking control is essential. This tracking control is conventionally performed by using a push-pull method (one beam method) or three beam method (out-trigger method).

As a typical conventional example of a tracking circuit, a lens tracking circuit may be mentioned wherein an objective lens is moved in response to a tracking error signal derived from the beam reflected by or transmitted through an optical disk, e.g., one beam or three beams formed from a beam irradiated from the laser by the one beam method or three beam method. The objective lens is normally supported and fixed by a spring on an optical head housing. A tracking actuator is energized to move the lens for the tracking control. When the tracking actuator is deenergized, the lens is held at a mechanically neutral point balanced by a spring force.

When the track eccentricity exceeds twenty or thirty microns, the objective lens deviates greatly from the mechanically neutral point, thereby combining an optical offset signal with the tracking error signal. The laser beam then traces a wrong track in response to the optical offset signal.

In order to eliminate the optical offset signal, a tracking system called a two-step servo system has been developed, as described in U.S. Pat. No. 4,761,773. According to this system, the carriage and hence the optical pickup itself as well as the objective lens are moved to perform cooperative tracking.

Meanwhile, since the distance from the optical pickup to disk shifts minutely in the read mode in which the disk is rotated, it is difficult to correctly read data due to the shift, thus rendering focusing control essential. This focusing control is conventionally performed by astigmatic method using astigmatism or a knife edge method.

As a typical conventional example of a focusing circuit, a lens focusing circuit may be mentioned wherein an objective lens is moved in response to a focusing error signal derived from laser beam which is irradiated from laser source and then reflected by or transmitted through an optical disk. The objective lens is normally the same lens that is used for the tracking control. A focusing actuator is energized to move the lens for the focusing control. When the focusing actuator is deenergized, the lens is held at a mechanically neutral point balanced by a spring force.

The conventional optical pickup having the tracking control apparatus will be described in detail with reference to FIGS. 1A and 1B.

FIG. 1A is a schematic view for showing a conventional optical pickup. As shown in the figure, a light source 10 has a laser diode to generate a laser beam. In the case of the three beam method, grating 18 is provided at the front or the rear of a collimator lens 11, that is, between laser source 10 and collimator lens 11 or collimator lens 11 and a beam splitter 12, which separates one beam into three beams. The laser beam irradiated from laser source 10 is changed into parallel beams by collimator lens 11. These parallel beams, in the three beam case, are separated into three beams by grating 18 and then pass through the beam splitter 12, a $\lambda/4$ plate 13, and an objective lens 14 to be incident upon the surface R of the disc D to form a beam spot of about 1 μm.

Beam splitter 12 has two right-angled prisms of which oblique (45°) facets meet with each other. On the oblique facet, a polarizing film is formed so that while ensuring the straight property of the incident beam, a part of the incident beam transmits the prisms and the other part is reflected from the polarizing film at an angle of 90° with respect to the incident beam. Additionally, $\lambda/4$ plate 13 serves to avoid interference of the incident beam and the reflective beam, and transforms a linear polarization into a circular polarization or inversely using double refraction phenomena.

The intensity of the light reflected from the disk D depends on existence of a pit thereof having recorded data. The recorded information is read out on the basis of the intensity of the reflected light. The reflected light is transformed into the parallel light while going through the objective lens 11, polarized by 90° at $\lambda/4$ plate 13, and then is incident onto beam splitter 12. In beam splitter 12, one part of the incident beam is reflected at 90°. A converging lens 15 is placed at the optical path of the reflected light to converge the reflected light. The reflected light converged by converging lens 15 goes through cylindrical lens 16 (or knife edge) and then is received by a four or six partitioned light-receiving diode 17. The position errors of the pickup apparatus with repect to the disk D including a focusing error and a tracking error are detected from the image of the beam received on light-receiving diode 17, and focusing error signals and tracking error signals are generated according to these errors. A voice coil motor 19 as the objective lens actuator is actuated to move the objective lens in response to the error signals, so that focusing and tracking can be controlled. The information on the disk is reproduced on the basis of the intensity of the reflected light which is determined by pit (P) on the disk (D).

According to the conventional optical pickup, when the focusing error or tracking error is detected by light-receiving diode 17, voice coil motor 19 is actuated to move objective lens 14 in a horizontal or vertical direction, so that the laser beam can be focused and tracked accurately on the surface of the disk D. That is, in the case of focusing control, a focusing coil part of voice coil motor 19 is energized to move objective lens 14 in the vertical (axial) direction. On the other hand, in the case of tracking control, the tracking coil part of voice coil motor 19 is energized to move objective lens 14 in the horizontal (radial) direction.

When voice coil motor 19 is operated by the two-axially actuating method in this way, there is a problem that a damping process has to be performed in order to avoid the occurrence of a resonance within the resonance frequency bandwidth since voice coil motor 19 has its own resonance frequency.

Furthermore, as shown in FIG. 1B, the tracking and focusing servo bandwidths are narrow, i.e., the higher the frequency is increased (applied to voice coil motor 19 which is the actuator of the objective lens), the more the sensitivity (the amplitude of the beam spot on the disk to the frequency) of voice coil motor 19 deteriorates. Therefore, there is another problem when responding to a high-frequency tracking error signal occurring at far higher frequency than the resonance frequency, e.g., occurring at a multiple kHz frequency, that tracking errors cannot be compensated accurately since the sensitivity is fairly low in such frequency band.

Furthermore, there is another problem that the tracking servo cannot be carried out smoothly when a large impact is applied during the reproduction of the disk D.

SUMMARY OF THE INVENTION

The present invention is intended to overcome the above-mentioned and numerous other disadvantages and deficiencies of the prior art. Therefore, it is a first object of the present invention to provide a tracking control apparatus which, in compensation for a tracking error signal, can improve the sensitivity to a high-frequency tracking error signal occurring within the far higher frequency band than the resonance frequency, thereby achieving satisfactory tracking control.

It is a second object of the present invention to provide an optical pickup having the above tracking control apparatus.

In order to achieve the above first object of the present invention, there is provided a tracking control apparatus which comprises:

a laser source having a plurality of laser emitting devices for generating a laser beam, each of the laser emitting devices being operated selectively;

a receiving means for receiving a part of the laser beam reflected from a data recording medium when tracking the data recording medium by means of the laser beam irradiated through an objective lens from the laser source;

a means for generating a tracking error signal relative to a tracking error which means a difference between a desired track and a position tracked by the laser beam, on the basis of an image of the laser beam received by the receiving means; and an actuating means for selectively actuating light emitting devices located at a position compensatory for the tracking error among the laser emitting devices in response to the tracking error signal generated by the tracking error signal generating means.

Furthermore, according to the present tracking control apparatus, the laser emitting devices are arranged linearly and in such direction that if the laser beams emitted from all the laser emitting devices are incident on the data recording medium, traces of the beams are formed across tracks on the data recording medium.

In order to achieve the above-described second object of the present invention, the optical pickup for controlling tracking and focusing comprises:

a laser source having a plurality of laser emitting devices for generating a laser beam, each of the laser emitting devices being operated selectively;

a lens group for determining optical paths of incident beams which are incident on a data recording medium and reflected beams which are reflected from the recording medium and for reading out data recorded on the data recording medium, the lens group including an objective lens;

a first receiving means for performing focusing, the first receiving means receiving a first part of the reflected beams for detecting a focusing error;

a second receiving means for performing tracking, the second receiving means receiving a second part of the reflected beams for detecting a tracking error;

a means for generating a focusing error signal relative to the focusing error on the data recording medium on a basis of an image of the laser beam received by the first receiving means;

an objective lens actuator for compensating for the focusing error by moving the objective lens in response to the focusing error signal;

a means for generating a tracking error signal relative to the tracking error which represents a difference between a desired track and a position tracked by the laser beam, on the basis of an image of the laser beam received by the second receiving means; and a laser emitting devices actuating means for selectively actuating a first light emitting device located at a position compensatory for the tracking error among the light emitting devices in response to the tracking error signal generated by the tracking error signal generating means.

Furthermore, according to the present optical pickup, the laser emitting devices are arranged linearly and in such direction that if the laser beams emitted from all the laser emitting devices are incident on the data recording medium, traces of the beams are formed across tracks on the data recording medium.

According to this tracking control apparatus and optical pickup with it, there are appropriately selected and actuated light emitting devices located at the position compensatory for the tracking error among the laser emitting devices in response to a tracking error signal. Since the laser source is used to compensate for a tracking error signal, the sensitivity to the frequency is maintained excellently even to a multiple GHz frequency as well as a multiple kHz frequency. Therefore, precise tracking can be achieved.

BRIEF DESCRIPTION OF THE DRAWINGS

The present invention may be better understood and its numerous objects and advantages will be more apparent to those skilled in the art by reference to the accompanying drawings in which.

DESCRIPTION OF THE PREFERRED EMBODIMENT

The preferred embodiment of this invention will be described in detail with reference to the accompanying drawings.

Figure 1A:
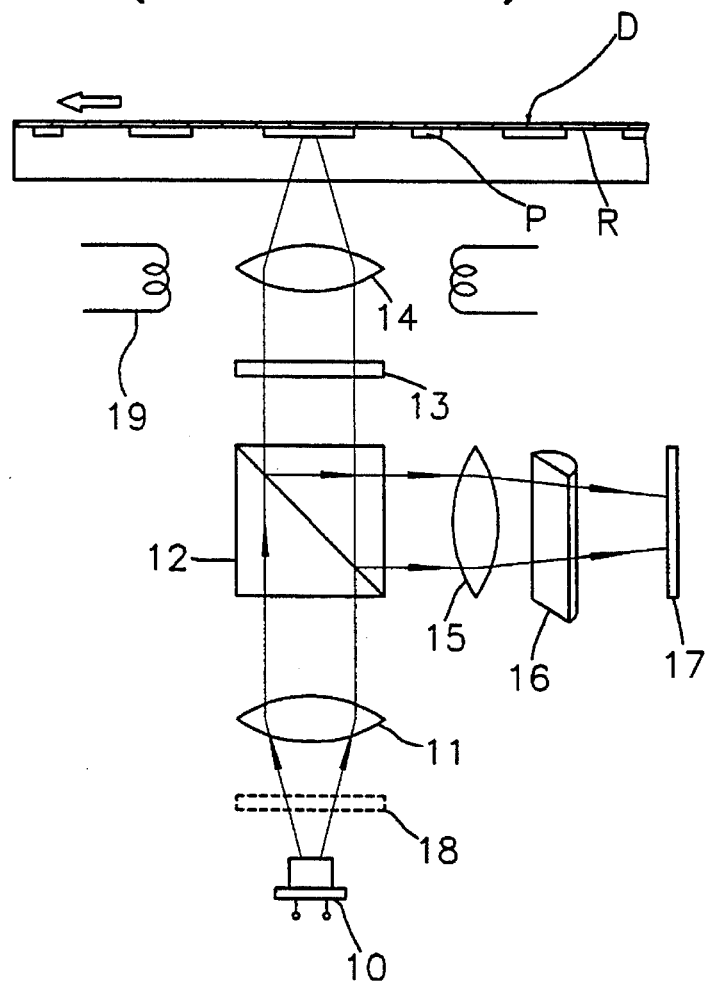
FIG. 1A is a schematic view for showing a conventional optical pickup.
Figure 1B:
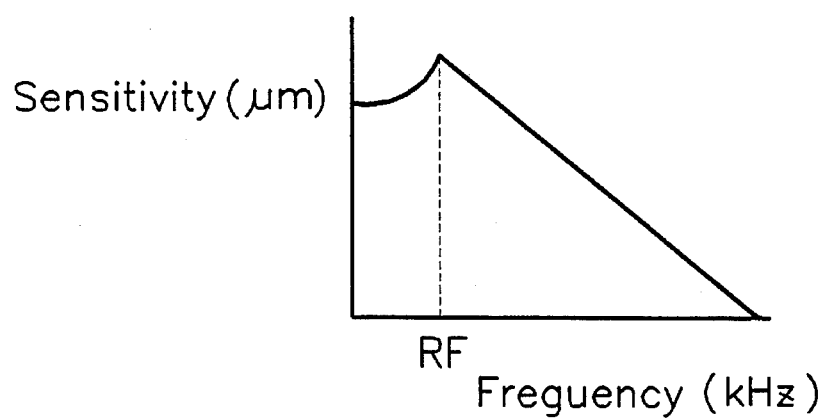
FIG. 1B is a graph for showing frequency response characteristics of a voice coil motor in the optical pickup of FIG. 1A.
Figure 2:
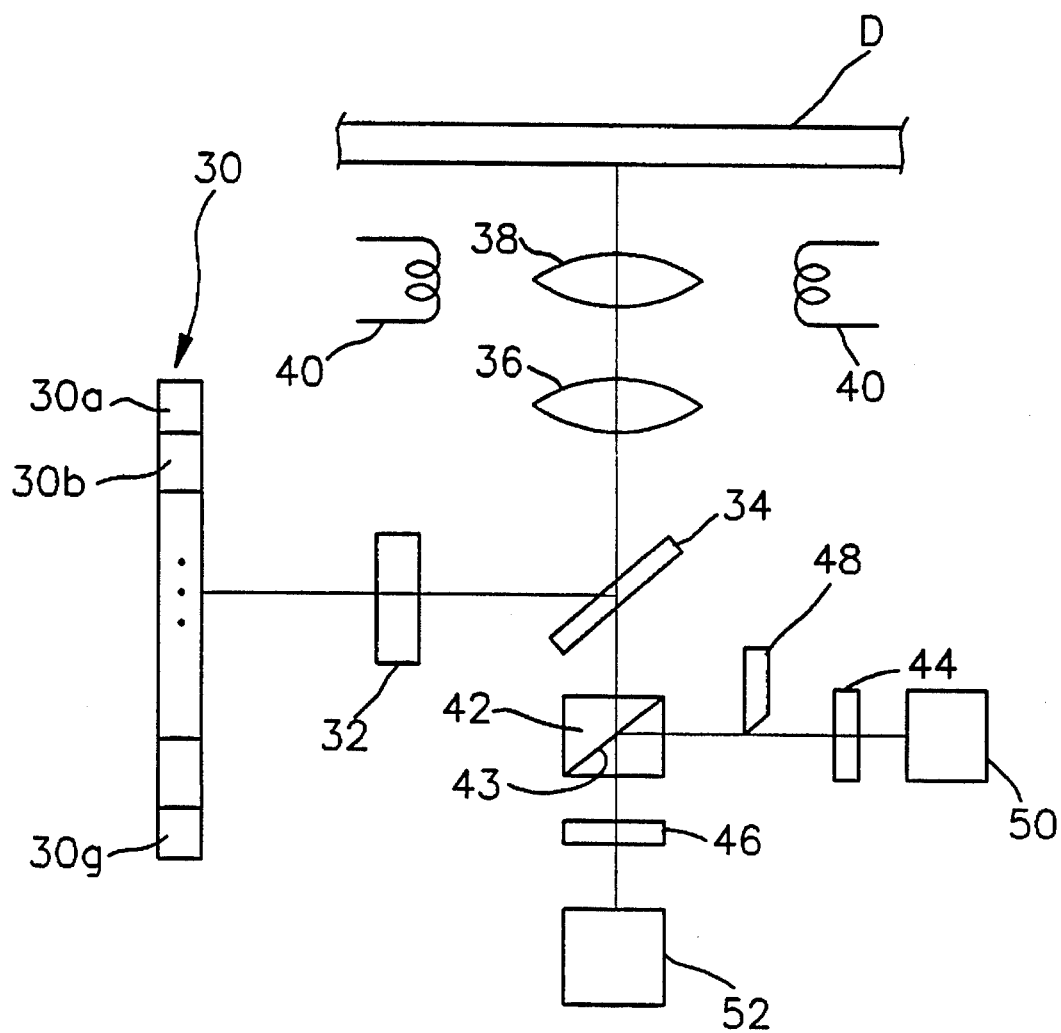
FIG. 2 is a schematic view for showing an optical pickup comprising a laser source having a plurality of linearly arranged laser emitting devices according to one embodiment of the present invention.

FIG. 2 is a schematic view for showing an optical pickup comprising a laser source having a plurality of linearly arranged laser emitting devices according to one embodiment of the present invention.

D denotes a data recording medium such as a disk to be irradiated with laser beam. Reference numeral 30 denotes a light source of this laser beam. Laser source 30 has a plurality of linearly arranged laser emitting devices, each of the laser emitting devices can be actuated selectively.

For reading out data recorded on the data recording medium D by using the laser beam generated from laser source 30, there is provided a lens group having a grating 32, first and second beam splitters 34 and 42, a collimator lens 36, an objective lens 38, etc., which lens group determines optical paths of beams which are incident on data recording medium D and of the beams reflected therefrom. In detail, reference numeral 32 denotes a grating for separating the laser beam from laser source 30 into three beams. First beam splitter 34 is placed such that the laser beams separated into three beams by grating 32 are directed toward the disk D. The laser beam reflected by 90° by first beam splitter 34 is transformed into the parallel beam by passing through collimator lens 36. The laser beam which has passed through collimator lens 36 transmits objective lens 38 to be focused on the surface of the disk D. Reference numeral 40 denotes an objective lens actuator, e.g., a voice coil motor, which serves to control focusing on the disk by controlling the axial displacement of objective lens 38. The incident laser beam is reflected from the disk D, and the reflected laser beam transmits in order objective lens 38, collimator lens 36, and first beam splitter 34, to be incident on a second beam splitter 42 where the laser beam is split. Second beam splitter 42 has two right-angled prisms of which oblique (45°) facets meet with each other. A polarizing film 43 is formed on the oblique facet, so that while ensuring the straight traveling property of the incident beam, a part of the incident beam can be transmitted through the prisms and the other part is reflected from polarizing film 43 at an angle of 90° with repect to the incident beam.

In order to perform focusing, a first photodetector 44 is provided for receiving some part of the beam reflected from the data recording medium D which has been split by second beam splitter 42 to detect focusing errors and data. In order to perform tracking, a second photodetector 46 is provided for receiving the other part of the beam reflected from the data recording medium which has been reflected by second beam splitter 42 to detect tracking errors. First and second photodetectors 44 and 46 have rectangular shapes corresponding to the arrangement direction of the laser emitting devices so that they can receive all of the beams (comprising up to ±1 order diffracted beam) which are irradiated from laser emitting devices 30a, 30b, . . . 30g which constitute laser light source 30 and then reflected from the surface of the disk D.

A focusing error signal generating device 50 is coupled to first photodetector 44 to perform the focusing operation. Focusing error signal generating device 50 detects a focusing error on the disk D on the basis of an image of the laser beam received by photodetector 44 to generate a focusing error signal.

A voice coil motor 40 as an objective lens actuator is placed around objective lens 38 so that voice coil motor 40 can compensate for the focusing error by moving objective lens 38 in an axial direction (that is, in the axial direction of disk D) in response to this focusing error signal.

A tracking error signal generating device 52 is coupled to second photodetector 46 to perform tracking operation. Tracking error signal generating device 52 detects a tracking error which represents a difference between a desired track on the disk D and a position tracked by the laser beam, on the basis of an image of the laser beam received by photodetector 46 to generate a tracking error signal.

A microprocessor 53 is coupled to laser source 30 as a laser emitting devices actuating means so that the microprocessor 53 can selectively actuate light emitting devices located at a position compensatory for the tracking error among the laser emitting devices 30a, 30b, . . . 30g of the laser source 30 in response to the tracking error signal generated by tracking error signal generating device 52. Furthermore, a plurality of laser emitting devices 30a, 30b, . . . 30g of laser source 30 are arranged linearly and in such direction that if the laser beams emitted from all the laser emitting devices pass through the lens group such as grating 32, first and second beam splitter 34 and 42, collimator lens 36, objective lens 38, etc., to be incident on the disk D, traces of the beams are formed across tracks on the disk D.

Hereinafter, an operation of the optical pickup of the present invention will be described.

The disk D is irradiated with the laser beam emitted from one of linearly arranged laser emitting devices 30a, 30b, . . . 30g. The laser beam is separated into three beams by grating 32, being incident on first beam splitter 34. The path of the laser beam separated into three beams is bent through 90° by first beam splitter 34 to be directed toward the data recording medium, i.e., disk D. This laser beam is transmitted through collimator lens 36 and is transformed into the parallel beam by collimator lens 36. The laser beam having passed through collimator lens 36 is transmitted objective lens 38 to be focused on the surface of the disk D.

This incident laser beam is reflected from the disk D. The intensity of the light reflected from the disk D depends on the existence of a pit thereof. This reflected light is transmitted in the order of objective lens 11, collimator lens 36, and first beam splitter 34, being incident on second beam splitter 42. This beam incident onto second beam splitter 42 is split by polarizing film 43 formed on its 45° oblique facet. That is, one part of the incident beam is reflected to be bent through 90°, and the other part goes straight without reflection.

Figure 3:
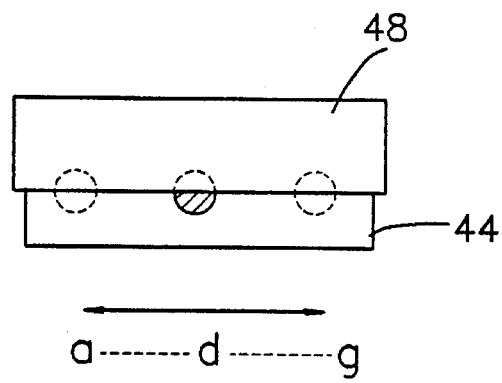
FIG. 3 is a schematic view for showing the image of the beam received by a photodetector for focusing in the optical pickup of FIG. 2.

The beam reflected by polarizing film 43 the path of which is to be bent through 90° is received by first photodetector 44. A knife edge 48 is placed before first photodetector 44 for detecting focusing errors. Thus, the proper compensating value is determined by focusing error signal generating device 50 on the basis of an image of the laser beam received by photodetector 44, and the focusing error signal is generated by focusing error signal generating device 50 on the basis of the compensating value. According to the focusing error signal, voice coil motor 40 is actuated to move objective lens 38 in axial direction, thereby focusing control being performed. FIG. 3 is a schematic view for showing the image of beam received by first photodetector 44 for focusing in the optical pickup of FIG. 2. The part represented by deviant lines shows a shape of the beam spot in which the above half of the beam generated from light emitting device 30d is cut by knife edge 48. An arrow shown in the lower part of FIG. 3 shows a change of directions of the receiving part according to changes of light source, e.g., a change from the present light emitting device 30d to the next light emitting device 30c or 30e, etc.

Figure 4:
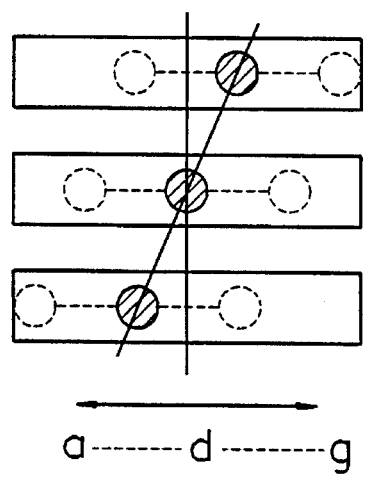
FIG. 4 is a schematic view for showing the image of the beam received by a photodetector for tracking in the optical pickup of FIG. 2.

The straight beam without reflection from polarizing film 43 is received by second photodetector 46. A tracking error which represents a difference between a desired track and a position tracked by the laser beam, is detected on the basis of an image received by photodetector 46. Thus, the proper compensating value relative to this tracking error is determined by tracking error signal generating device 52 coupled to second photodetector 46, and the tracking error signal is generated by tracking error signal generating device 52 on the basis of the compensating value. FIG. 4 is a schematic view for showing the image of beam received by the second receiving device 46. The part represented by deviant lines shows a position of the beam spot on second photodetector 46 by three beam method when light emitting device 30d emits laser beam. An arrow shown in the lower part of FIG. 4 shows a change of directions of the receiving part according to changes of the light source, e.g., a change from light emitting device 30d to light emitting device 30c or 30e, etc.

In response to the tracking error signal generated by tracking error signal generating device 52, a microprocessor 53 selectively actuates the light emitting devices located at a position compensatory for the tracking error among a plurality of laser emitting devices 30a, 30b, . . . 30g of laser source 30. For example, when a tracking control signal is generated which is required to control tracking inward in the radial direction of the disk D in emitting of laser emitting device 30d, the light source is changed from laser emitting device 30d to laser emitting device 30e or 30f according to the tracking control signal.

Figure 5:
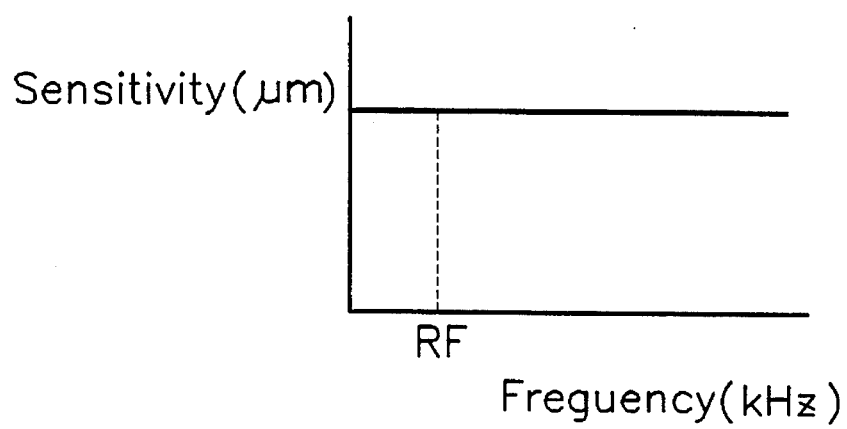
FIG. 5 is a graph for showing frequency response characteristics of the laser source in the optical pickup of FIG. 2.

The tracking control apparatus and optical pickup having the same of the present invention comprise a laser source having a plurality of laser emitting devices, and tracking errors are compensated by these laser emitting devices. This laser source having a plurality of laser emitting devices can cover even to a multiple MHz frequency in the response to the tracking error signal. As shown in FIG. 5, when tracking is performed with the laser source having a plurality of laser emitting devices, the sensitivity (the mechanical amplitude of the beam spot on disk D) to the frequency (the frequency supplied to the laser source) is maintained excellently even to a multiple GHz frequency, thereby providing correct tracking control. Moreover, the construction of the tracking servo system becomes simple, e.g., the construction of the voice coil motor can be driven by single axis only for focusing.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be construed as encompassing all the features of the patentable novelty that reside in the present invention, including all the features that would be treated as equivalents thereof by those skilled in the art to which this pertains.

What is claimed is:

1. A tracking control apparatus comprising:
   a laser source having a plurality of laser emitting devices for generating a laser beam, each of said laser emitting devices being operated selectively;
   a receiving means for receiving a part of the laser beam reflected from a data recording medium when tracking the data recording medium by means of the laser beam irradiated through an objective lens from said laser source;
   a means for generating a tracking error signal relative to a tracking error which represents a difference between a desired track and a position tracked by the laser beam, on the basis of an image of the laser beam received by said receiving means; and
   an actuating means for selectively actuating laser emitting devices located at a position compensatory for the tracking error among said laser emitting devices in response to the tracking error signal generated by said tracking error signal generating means.

2. The tracking control apparatus as claimed in claim 1, wherein said laser emitting devices are arranged linearly and in such direction that if the laser beams emitted from all said laser emitting devices are incident on the data recording medium, traces of the beams are formed across tracks on the data recording medium.

3. An optical pickup for tracking and focusing comprising:
   a laser source having a plurality of laser emitting devices for generating a laser beam, each of said laser emitting devices being operated selectively;
   a lens group for determining optical paths of incident beams which are incident on a data recording medium and reflected beams which are reflected from said recording medium and for reading out data recorded on the data recording medium, said lens group including an objective lens;
   a first receiving means for performing focusing, said first receiving means receiving a first part of the reflected beams for detecting a focusing error;
   a second receiving means for performing tracking, said second receiving means receiving a second part of the reflected beams for detecting a tracking error;
   a means for generating a focusing error signal relative to the focusing error on the data recording medium on a basis of an image of the laser beam received by said first receiving means;
   an objective lens actuator for compensating for the focusing error by moving the objective lens in response to the focusing error signal;
   a means for generating a tracking error signal relative to the tracking error which represents a difference between a desired track and a position tracked by the laser beam, on the basis of an image of the laser beam received by said second receiving means; and
   a laser emitting devices actuating means for selectively actuating a first laser emitting device located at a position compensatory for the tracking error among the laser emitting devices in response to the tracking error signal generated by said tracking error signal generating means.

4. The optical pickup as claimed in claim 3, wherein said laser emitting devices are arranged linearly and in such a direction that if the laser beams emitted from all of said laser emitting devices are incident on the data recording medium, traces of the laser beams are formed across tracks on the data recording medium.

5. The optical pickup as claimed in claim 3, wherein said first receiving means has a sufficient width for receiving all of the laser beams which are emitted from the laser emitting devices.

6. The optical pickup as claimed in claim 3, wherein said second receiving means has a sufficient width for receiving all of the laser beams which are emitted from the laser emitting devices.

7. The optical pickup as claimed in claim 3, wherein said laser emitting devices actuating means comprises a microprocessor.

* * * * *